United States Patent
Rajagopalan

(10) Patent No.: US 10,778,535 B2
(45) Date of Patent: Sep. 15, 2020

(54) MULTILAYERED COMPLIANCE MANAGEMENT FOR CLOUD ENVIRONMENTS

(71) Applicant: Hewlett Packard Enterprise Development LP, Houston, TX (US)

(72) Inventor: Sundaram M. Rajagopalan, Waltham, MA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 61 days.

(21) Appl. No.: 16/248,021

(22) Filed: Jan. 15, 2019

(65) Prior Publication Data
US 2020/0228415 A1  Jul. 16, 2020

(51) Int. Cl.
*H04L 12/24* (2006.01)
*G06F 9/451* (2018.01)
*H04L 29/08* (2006.01)
*G06F 9/50* (2006.01)

(52) U.S. Cl.
CPC .......... *H04L 41/22* (2013.01); *G06F 9/451* (2018.02); *G06F 9/5072* (2013.01); *H04L 41/0806* (2013.01); *H04L 67/12* (2013.01)

(58) Field of Classification Search
None
See application file for complete search history.

(56) References Cited

U.S. PATENT DOCUMENTS

| 8,862,720 B2 | 10/2014 | DeHaan et al. |
| 10,326,845 B1 * | 6/2019 | Jaeger ............ G06F 9/00 |
| 2016/0072676 A1 * | 3/2016 | Gomadam ...... H04L 41/145 709/221 |
| 2016/0337473 A1 | 11/2016 | Rao |

FOREIGN PATENT DOCUMENTS

WO  WO-2016097829 A1  6/2016

OTHER PUBLICATIONS

Future Generation Computer Systems, "Multi-layer cloud architecture model and ontology-based security service framework for IoT-based smart homes", retrieved online Oct. 24, 2016, https://www.sciencedirect.com/science/article/pii/S0167739X16305775 (Year: 2016).*

(Continued)

*Primary Examiner* — Tuan S Nguyen
(74) *Attorney, Agent, or Firm* — Hewlett Packard Enterprise Patent Department

(57) ABSTRACT

Systems and methods are provided for multilayered compliance management for cloud environments. In some embodiments, the method includes providing, in a domain of a customer, an environment operations layer, the environment operations layer controlling a plurality of sensors and actuators within a cloud environment of the customer; providing a controls layer, the controls layer comprising a plurality of controls to control the sensors and actuators in accordance with one or more compliance rules; and providing a user interface in a domain outside the domain of the customer, the user interface comprising a plurality of management tools to manage the controls.

20 Claims, 9 Drawing Sheets

(56) References Cited

OTHER PUBLICATIONS

BMC Software, Inc., "Multi-Cloud Management," retrieved Nov. 19, 2018, http://www.bmcsoftware.in/it-solutions/multi-cloud-management.html.
Poole, J., "3 Ways Multi-cloud Exchanges Can Simplify Hybrid IT," Oct. 4, 2016, https://blog.equinix.com/blog/2016/10/04/3-ways-multi-cloud-exchanges-can-simplify-hybrid-it/.
scality.com, "What is Multi-Cloud?" retrieved online Nov. 19, 2018, https://www.scality.com/what-is-multi-cloud/.
unitedlayer.com, "Multi-Cloud—Unitedlayer," retrieved online Nov. 19, 2018, https://www.unitedlayer.com/multi-cloud.

* cited by examiner

MULTILAYERED COMPLIANCE MANAGEMENT FOR CLOUD ENVIRONMENTS

DESCRIPTION OF RELATED ART

The disclosed technology relates generally to computer networks, and more particularly to compliance management in cloud networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
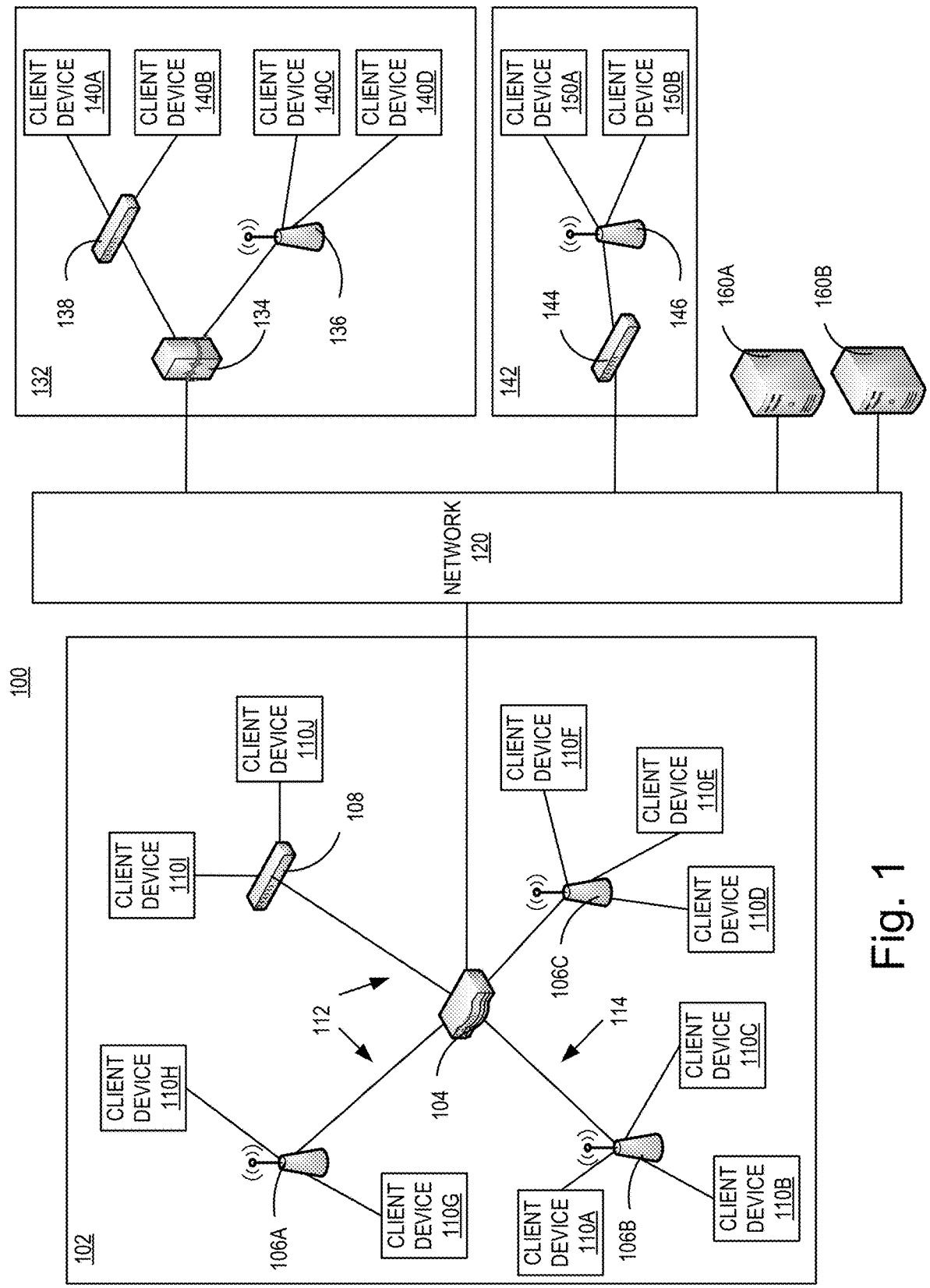
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

As companies transition computing to the cloud, new functionalities are demanded and consequently new complexities emerge. For example, audit of governance, regulation and compliance (GRC) becomes an increasingly difficult problem as cloud environments add the complexities of managing extremely quickly changing Information Technology (IT) environments, public-Internet facing infrastructure, and changing application developer needs such as virtualized compute, storage and network and new platform environments like containers. And during the transition, the emergence of hybrid IT has become an additional factor creating more complexity than the fairly recent on-premises and hardware-based IT environments. Previous methods of IT compliance, which relied heavily on human interactions and processes, are both error-prone and time consuming and in many cases, simply not possible in the cloud environment. There is thus a need to automate and streamline IT processes that are involved with keeping IT environments compliant but at the same time inexpensive and responsive to demand.

Furthermore, even IT environments not migrating to the cloud are being affected by cloud implementations. For example, many local data centers are being replaced by virtual data centers offered by cloud vendors. And these virtual data centers must meet the requirements of traditional data centers.

Embodiments of the disclosed technology provide a multi-layer architecture for managing multiple cloud environments. But while the disclosed technology is described in terms of cloud environments, the disclosed technology may be applied to other computing environments as well. The architecture includes two layers. The top layer is the controls layer, which has a global view of all accounts for a customer, and implements the necessary service-level agreements and delineation for typical multi-tenant and multi-account software as a service (SaaS). This controls layer allows the user to manage customer cloud environments, but is independent of the implementations of the customer cloud environments. The bottom layer is the environment operations layer, which interfaces with the sensors and actuators in the customer cloud environments and is therefore specific to the implementation of the customer cloud environments, for example, specific to a particular cloud vendor implementation. According to various embodiments described herein, the bottom layer may be collocated with the top layer, or located in the customer domain, for example in the customer's data center. In some embodiments, the domain is an application domain.

By aligning a software layer with the cloud environment or cloud vendor that the customer uses, the disclosed embodiments can scale with customer needs, and, through the controls layer, provide an overall view of the network that is independent of the vendor or implementation of the cloud environment. And by implementing the environment operations layer within the customer domain, metadata is kept within the customer network, thereby minimizing exposure to security events.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120. Any of the sites 120, 132, and 142 may be implemented using cloud networking technology, and may include virtual data centers and the like.

The primary site 102 may include a primary network (not shown), which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102. These network communications may be wired or wireless, synchronous or asynchronous, and real-time or non-real-time.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (Aps) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160*a-b* include, for example, web servers, streaming radio and video providers, and cable and satellite television providers. The client devices 110*a* j, 140*a-d*, 150*a-b* may request and access the multimedia content provided by the content servers 160*a-b*.

Figure 2:
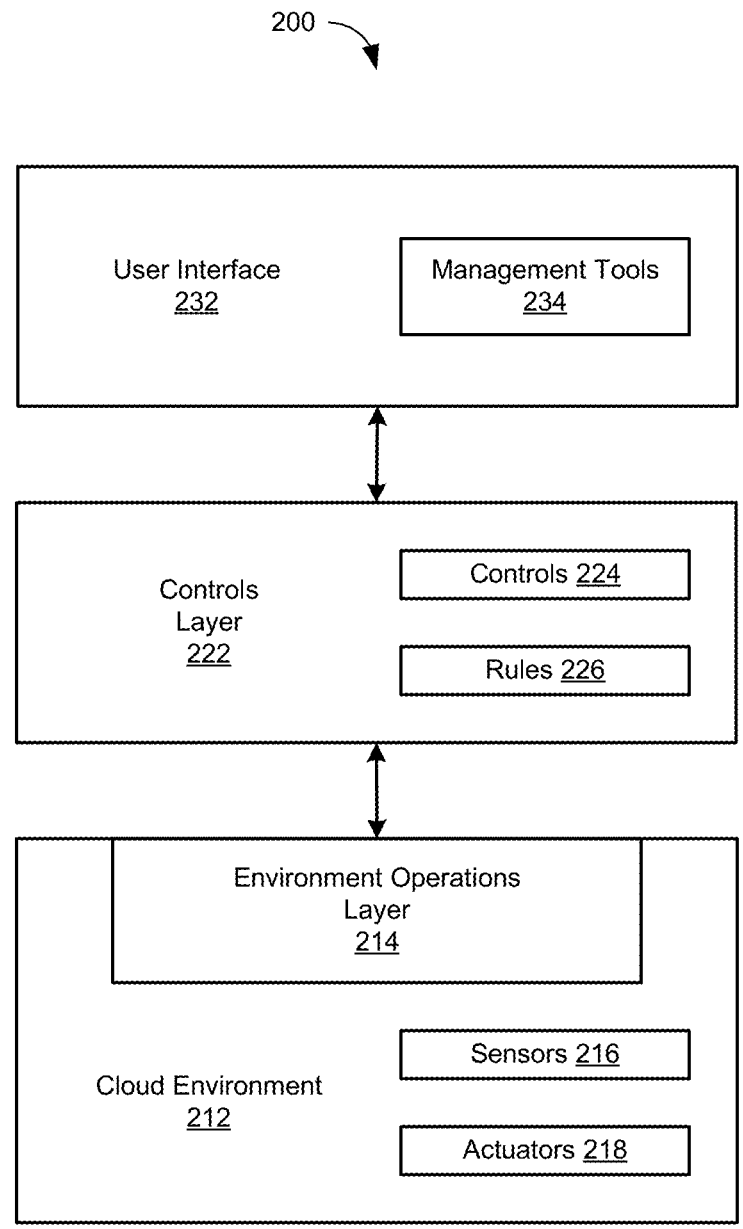
FIG. 2 illustrates a multi-layered compliance management architecture provided by embodiments of the disclosed technology.

FIG. 2 illustrates a multi-layered compliance management architecture provided by embodiments of the disclosed technology. Referring to FIG. 2, the architecture 200 includes a cloud environment 212. The cloud environment 212 may be include on-premises equipment, as with a hybrid IT environment. The cloud environment 212 may implement a virtual data center or the like.

The cloud environment 212 includes one or more sensors 216. The sensors 216 may include virtual sensors, for example to sense the value of a parameter stored in a memory location. The sensors 216 may include physical sensors, for example to sense the status of security alarms, door locks, lights, and the like. The cloud environment 212 may include one or more actuators 218. The actuators 218 may include virtual actuators, for example to change the value of a parameter stored in a memory location. The actuators 218 may include physical actuators, for example to actuate security alarms, door locks, lights, and the like.

One or more environment operations layers 214 may be deployed within the cloud environment 212. Each environment operations layer 214 forms the bottom layer of the multilayered architecture, and communicates with the sensors 216 and the actuators 218. The environment operations layer 214 may include cloud management interfaces provided by a cloud provider. Examples of current cloud providers include Microsoft Azure and Amazon Web Services (AWS). The cloud environments may be implemented as public cloud environments, private cloud environments, or a combination of the two.

The architecture 200 includes one or more controls layers 222. Each controls layer 222 includes one or more controls 224. The controls layer 222 is in communication with the environment operations layer 214 in the cloud environment 212. Each control 224 in the controls layer controls one of the sensors 216, or one of the actuators 218, in the cloud environment 212, in accordance with one or more compliance rules 226. In some embodiments, the compliance rules 226 include governance, regulation and compliance (GRC) rules.

The architecture 200 may include one or more user interfaces 232. Each user interface 232 may include one or more management tools 234. The management tools 234 may be employed by the user to manage the controls 224 in a controls layer 222. The multilayer architecture 200 thereby allows the user to control components of cloud environment 212 using an interface that is independent of the manner of implementation of the cloud environment 212.

Figure 3:
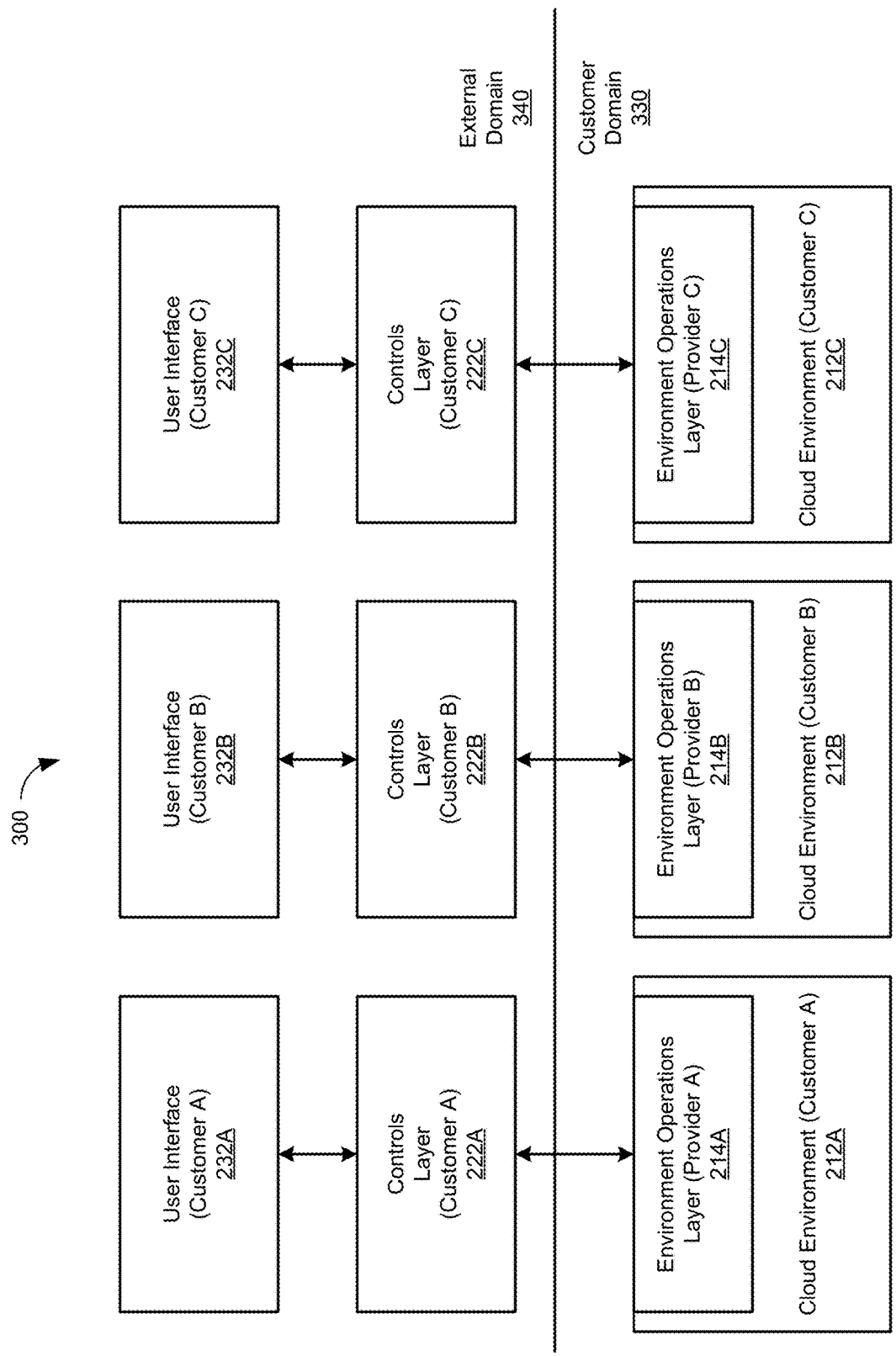
FIG. 3 depicts a multilayered cloud environment management system having multiple controls layers disposed outside the domain of the customer according to one embodiment.
Figure 4:
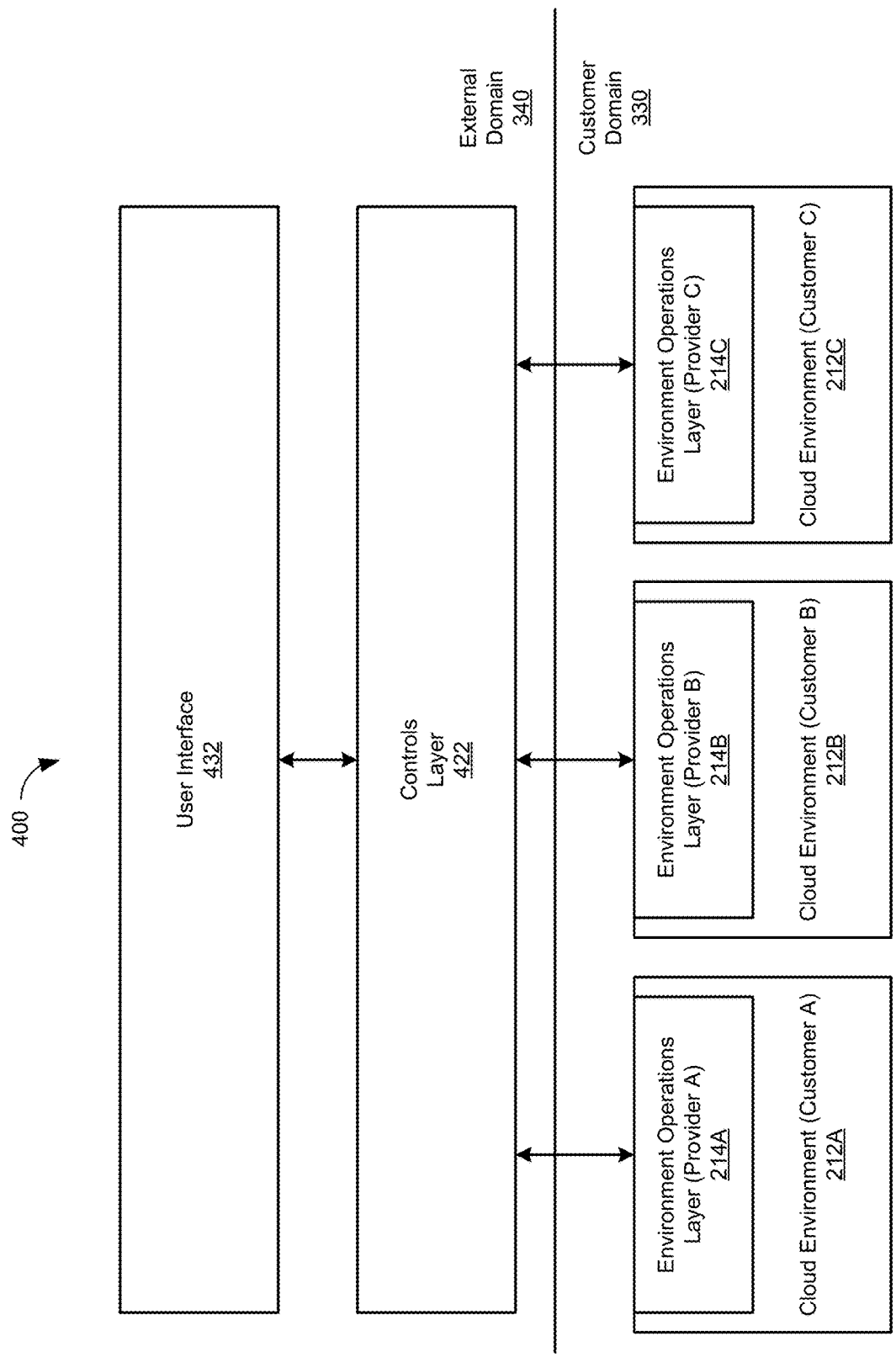
FIG. 4 depicts a multilayered cloud environment management system having a controls layer disposed outside the domain of the customer according to one embodiment.
Figure 5:
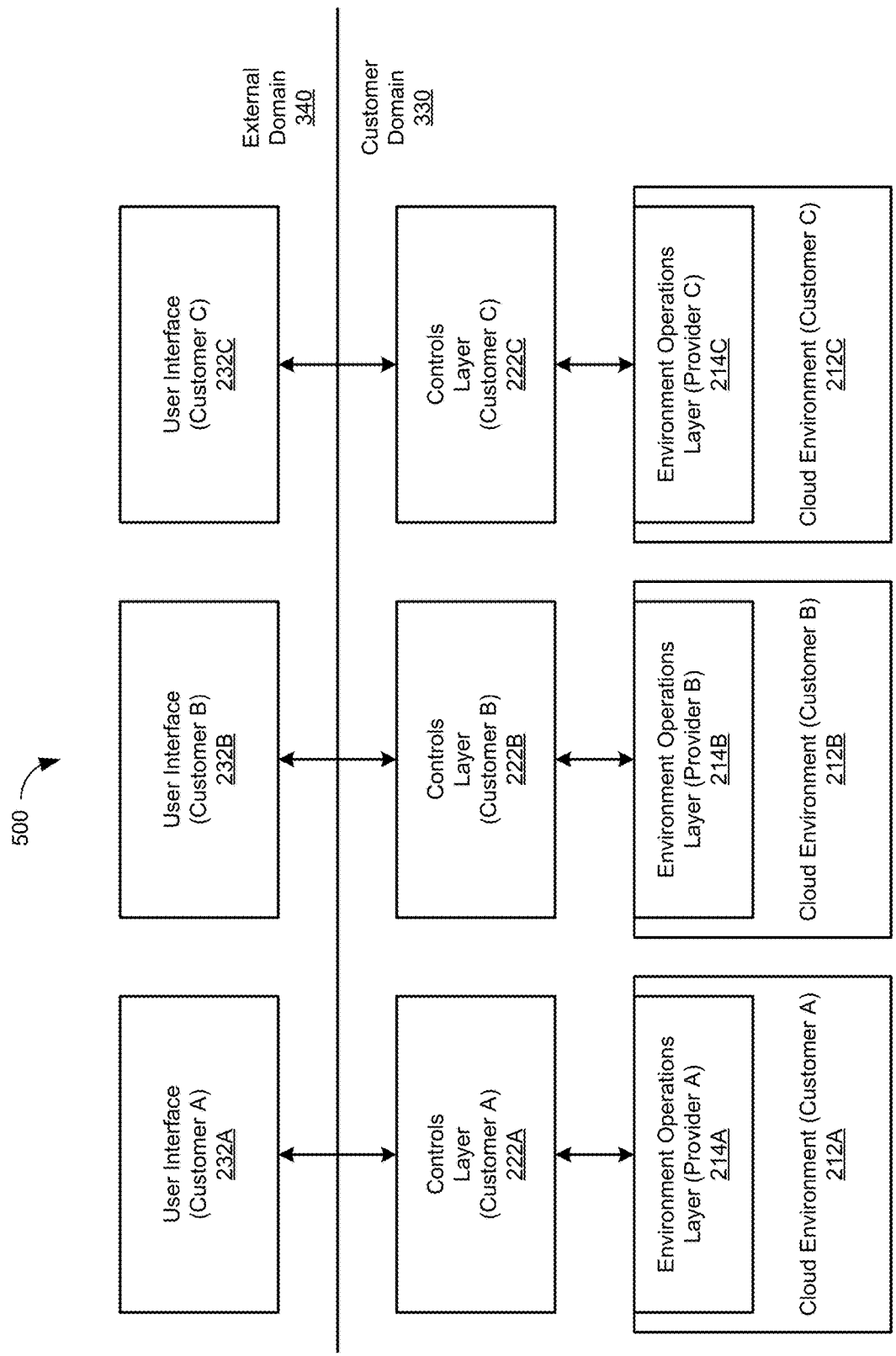
FIG. 5 depicts a multilayered cloud environment management system having multiple controls layers disposed inside the domain of the customer according to one embodiment.

The multi-layered architecture 200 of FIG. 2 may be implemented in a variety of multi-layered cloud environment management configurations to support different requirements. FIGS. 3-5 depict three example configurations. However, other configurations are contemplated.

FIG. 3 depicts an example multilayered cloud environment management system having multiple controls layers disposed outside the domain of the customer. Referring to FIG. 3, the cloud environment management system 300 includes multiple cloud environments 212A,B,C, each having a respective environment operations layer 214A,B,C, and each for a different customer A,B,C. Each cloud environment 212 may implement a different set of sensors 216 and actuators 218. While the cloud environment management system 300 of FIG. 3 serves three customers A,B,C, other embodiments may serve any number of customers. And while in the cloud environment management system 300 of FIG. 3 each customer has one silo, in other embodiments a customer may have multiple silos, for example to manage multiple different cloud environments.

The cloud management system 300 of FIG. 3 includes three controls layers 222A,B,C, each in communication with one of the environment operations layers 214A,B,C. Each controls layer 222 may implement a separate set of controls 224. In the embodiment of FIG. 3, the controls layers 222A,B,C are implemented in an external domain 340 that is outside the customer domain 330. This approach provides enhanced customer isolation by providing a separate silo for each customer, with each silo including a separate user interface 232, controls layer 222, and environment operations layer 214.

The cloud management system 300 of FIG. 3 includes three user interfaces 232A,B,C. Each user interface 232 may implement a separate set of management tools 234. Each of the user interfaces 232A,B,C is in communication with a respective one of the controls layers 222A, B,C.

FIG. 4 depicts a multilayered cloud environment management system having a user interface and a controls layer, both disposed outside the domain of the customer according to one embodiment. Referring to FIG. 4, the cloud environment management system 400 includes multiple cloud environments 212A,B,C, each having a respective environment operations layer 214A,B,C, and each for a different customer A,B,C. Each cloud environment 212 may implement a separate set of sensors 216 and actuators 218. While the cloud environment management system 400 of FIG. 4 serves three customers A,B,C, other embodiments may serve any number of customers. And while in the cloud environment management system 400 of FIG. 4 each customer has one silo, in other embodiments a customer may have multiple silos, for example to manage multiple different cloud environments.

The cloud management system 400 of FIG. 4 includes a controls layer 422. The controls layer 422 is in communication with all of the environment operations layers 214A, B,C. In some embodiments, the controls layer 222 may implement a set of controls 224 for all of the environments operations layers 214A,B,C. In other embodiments, the controls layer 422 may implement a separate set of controls 224 for each of the environment operations layers 214A,B, C. In still other embodiments, the controls layer 422 may implement a mix of common and separate controls 224. In the embodiment of FIG. 4, the controls layer 422 is implemented in an external domain 340 that is outside the customer domain 330. The controls layer 422 provides a unified controls layer, but with each user interface account having access to an isolated cloud environment 212.

The cloud management system 400 of FIG. 4 includes a user interface 432. The user interface 432 may implement a set of management tools 234. The user interface 532 is in communication with the controls layer 222. The user interface 432 provides a unified user interface, with views of multiple customers.

FIG. 5 depicts a multilayered cloud environment management system having multiple controls layers disposed inside the domain of the customer according to one embodiment. Referring to FIG. 5, the cloud environment management system 500 includes multiple cloud environments 212A,B,C, each having a respective environment operations layer 214A,B,C, and each for a different customer A,B,C. Each cloud environment 212 may implement a different set of sensors 216 and actuators 218. While the cloud environment management system 500 of FIG. 5 serves three customers A,B,C, other embodiments may serve any number of customers. And while in the cloud environment management system 500 of FIG. 5, each customer has a silo. In an example embodiment, a customer may have multiple silos, for example to manage multiple different cloud environments.

The cloud management system 500 of FIG. 5 includes three controls layers 222A,B,C, each in communication with at least one of the environment operations layers 214A,B,C. Each controls layer 222 may implement a separate set of controls 224. In the embodiment of FIG. 5, the controls layers 222A,B,C are implemented within the customer domain 330. This approach provides enhanced customer isolation by providing a separate silo for each customer, with each silo including a separate user interface 232, controls layer 222, and environment operations layer 214. This approach also provides complete data sovereignty by locating both the environment operations layer 214, and the controls layer 222, within the customer domain 330. Such implementations are ideal for high-security environments for example such as government data centers.

The cloud management system 500 of FIG. 5 includes three user interfaces 232A,B,C. Each user interface 232 may implement a separate set of management tools 234. Each of the user interfaces 232A,B,C is in communication with a respective one of the controls layers 222A, B,C.

Figure 6:
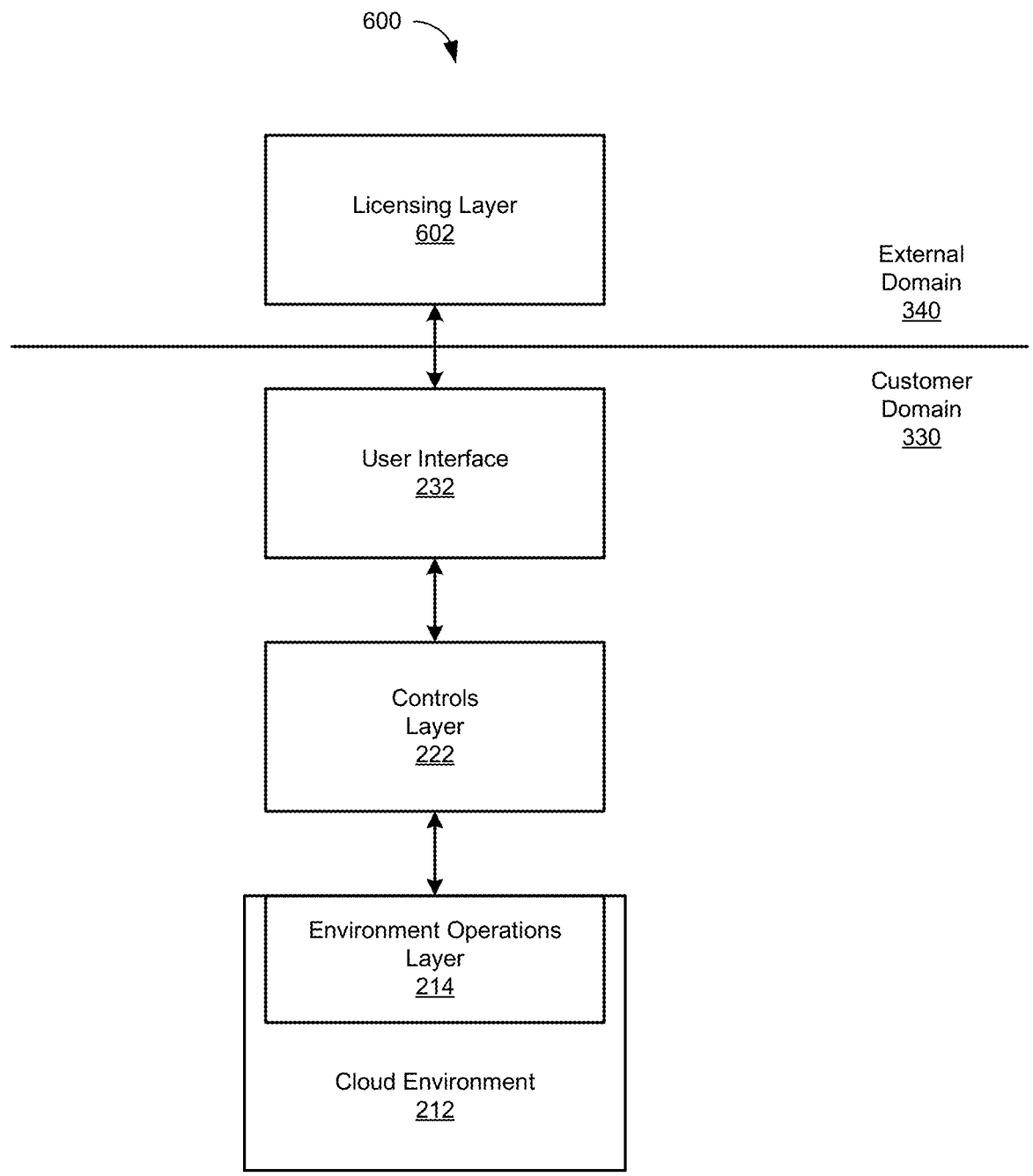
FIG. 6 depicts a standalone multilayered cloud environment management system having the user interface disposed inside the domain of the customer according to one embodiment.

FIG. 6 depicts a standalone multilayered cloud environment management system having the user interface disposed inside the domain of the customer according to one embodiment. Referring to FIG. 6, the cloud environment management system 600 includes a cloud environments 212 having an environment operations layer 214. The cloud environment 212 implements a set of sensors 216 and actuators 218.

The cloud management system 600 of FIG. 6 includes a controls layer 222 in communication with an environment operations layer 214. The controls layer 222 may implement a set of controls 224. In the embodiment of FIG. 6, the user interface 232 and the controls layer 222 are implemented within the customer domain 330. This approach provides enhanced customer isolation by consolidating the layers within the customer domain 330, with the exception of a licensing layer, which is placed in the external domain 340. The licensing layer 602 manages software licenses for the customer. In other embodiments, the licensing layer may be placed in the user interface layer 232, which is placed in the external domain. This approach also provides complete data sovereignty by locating the user interface 232, the environment operations layer 214, and the controls layer 222, within the customer domain 330. Such implementations enable high-security environments, e.g. government data centers.

Figure 7:
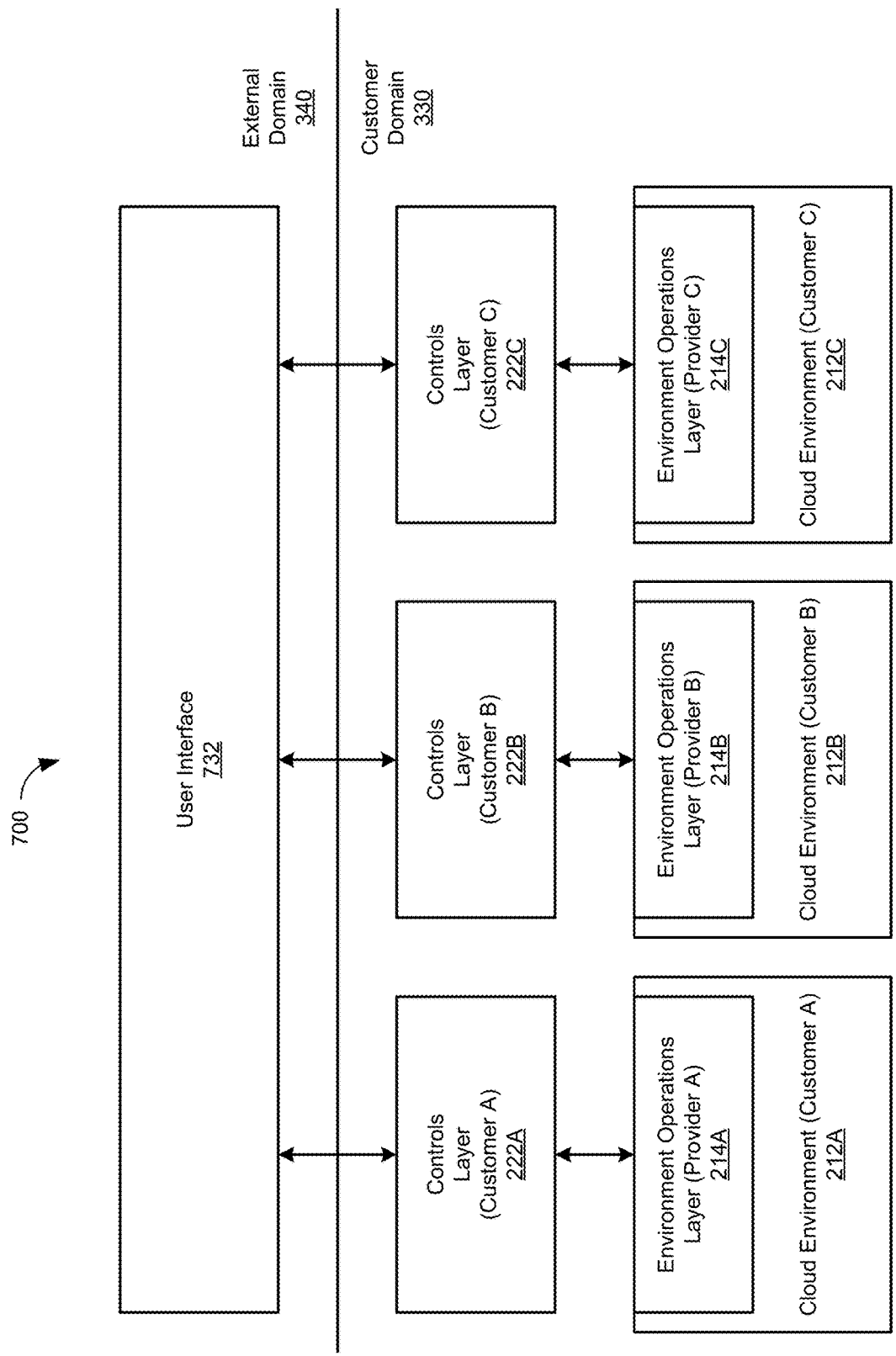
FIG. 7 depicts a multilayered cloud environment management system having multiple controls layers disposed inside the domain of the customer, and a user interface disposed outside the domain of the customer, according to one embodiment.

FIG. 7 depicts a multilayered cloud environment management system having multiple controls layers disposed inside the domain of the customer, and a user interface 232 disposed outside the domain of the customer, according to one embodiment. Referring to FIG. 7, the cloud environment management system 700 includes multiple cloud environments 212A,B,C, each having a respective environment operations layer 214A,B,C, and each for a different customer A,B,C. Each cloud environment 212 may implement a different set of sensors 216 and actuators 218. While the cloud environment management system 700 of FIG. 7 serves three customers A,B,C, other embodiments may serve any number of customers. And while in the cloud environment management system 700 of FIG. 7, each customer has one silo within the customer domain 330. In other embodiments, a customer may have multiple silos, for example to manage multiple different cloud environments.

The cloud management system 700 of FIG. 7 includes three controls layers 222A,B,C, each in communication with one of the environment operations layers 214A,B,C. Each controls layer 222 may implement a separate set of controls 224. In the embodiment of FIG. 7, the controls layers 222A,B,C are implemented within the customer domain 330. This approach provides enhanced customer isolation by providing a separate silo for each customer, with each silo including a separate user interface 232, controls layer 222, and environment operations layer 214. This approach also provides complete data sovereignty by locating both the environment operations layer 214, and the controls layer 222, within the customer domain 330. Such implementations are ideal for high-security environments for example such as government data centers.

The cloud management system 700 of FIG. 7 includes a user interface 732. The user interface 732 may implement a separate set of management tools 234. The user interface 232 is in communication with the controls layers 222A,B,C. The user interface 732 provides a unified user interface, with views of multiple customers.

Figure 8:
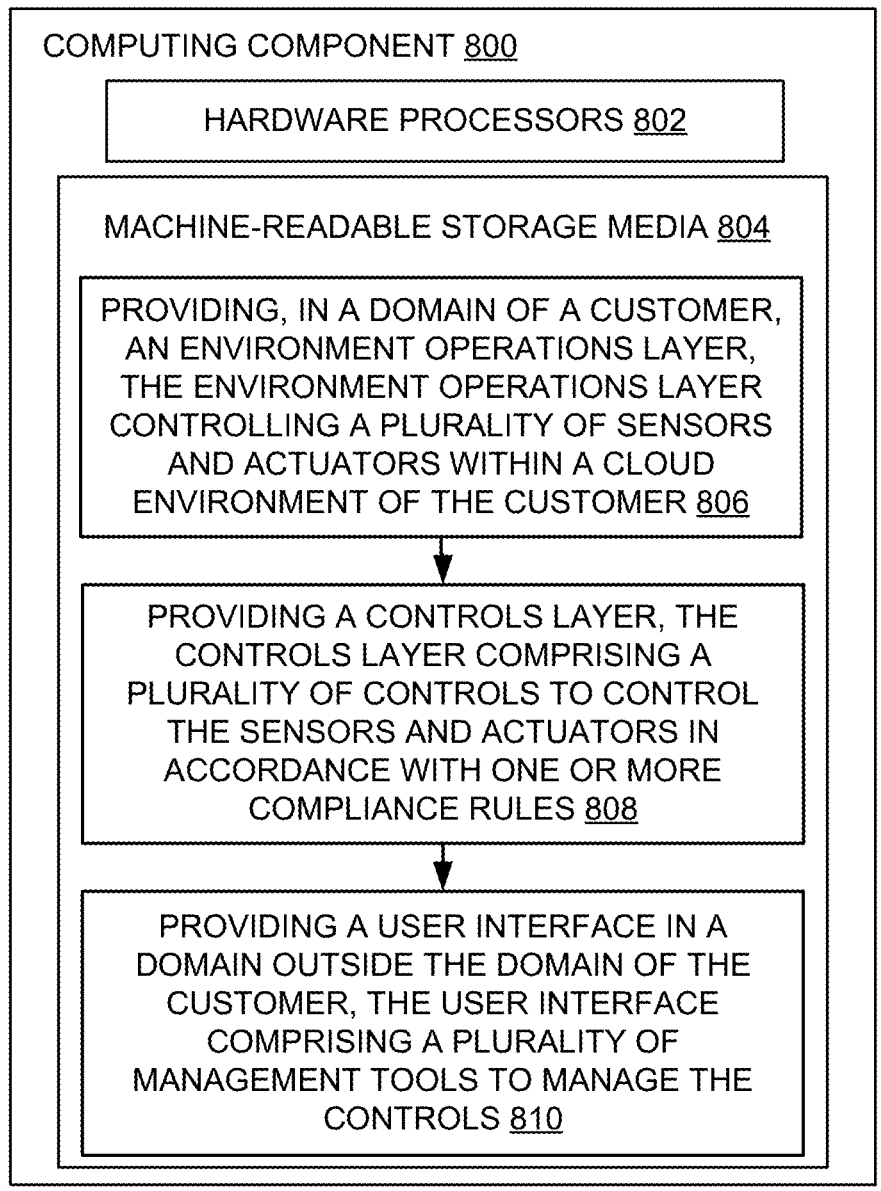
FIG. 8 is a block diagram of an example computing component or device for providing a multilayered cloud environment management system in accordance with one embodiment.

FIG. 8 is a block diagram of an example cloud component or device 800 for providing a multilayered cloud environment management system in accordance with one embodiment. Cloud component 800 may be, for example, a server computer, a controller, or any other similar cloud component capable of processing data. In the example implementation of FIG. 8, the cloud component 800 includes a hardware processor, 802, and machine-readable storage medium, 804.

Hardware processor 802 may be one or more central processing units (CPUs), semiconductor-based microprocessors, and/or other hardware devices suitable for retrieval and execution of instructions stored in machine-readable storage medium, 804. Hardware processor 802 may fetch, decode, and execute instructions, such as instructions 806-810, to control processes or operations according to various embodiments. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 804 may be a non-transitory storage medium, where the term "non-transitory" does not encompass transitory propagating signals. As described in detail below, machine-readable storage medium 804 may be encoded with executable instructions, for example, instructions 806-810.

Hardware processor 802 may execute instruction 806 to perform providing, in a domain 330 of the customer, an environment operations layer 214. The environment operations layer 214 controls a plurality of sensors 216 and actuators 218 within a cloud environment 212 of the customer.

Hardware processor 802 may execute instruction 808 to provide a controls layer 222. In the cloud environment management system 300 of FIG. 3, the controls layer 222 is implemented in a domain 340 outside the domain 330 of the customer. The controls layer 222 comprises a plurality of controls 224 to control the sensors 216 and actuators 218 in the cloud environment 212 of the customer in accordance with one or more compliance rules 226. For example, the compliance rules 226 may include governance, regulation and compliance (GRC) rules, as discussed above. The controls layer 222 may be implemented within a domain 330 of the customer, for example as shown in the system of FIG. 5. In some implementations, multiple controls layers 222 may be implemented, for example as shown in the systems of FIGS. 3 and 5. In some implementations, a control layer 222 may be implemented, for example as shown in the system of FIG. 4.

Hardware processor 802 may execute instruction 810 to perform providing a user interface 232 in a domain 340 outside the domain 330 of the customer. The user interface 232 comprises a plurality of management tools 234 to manage the controls 224 in the controls layer 222. Multiple user interfaces may be implemented, for example as shown in the systems of FIGS. 3 and 5. Alternatively, a user interface 232 may be implemented, for example as shown in the system of FIG. 4.

Figure 9:
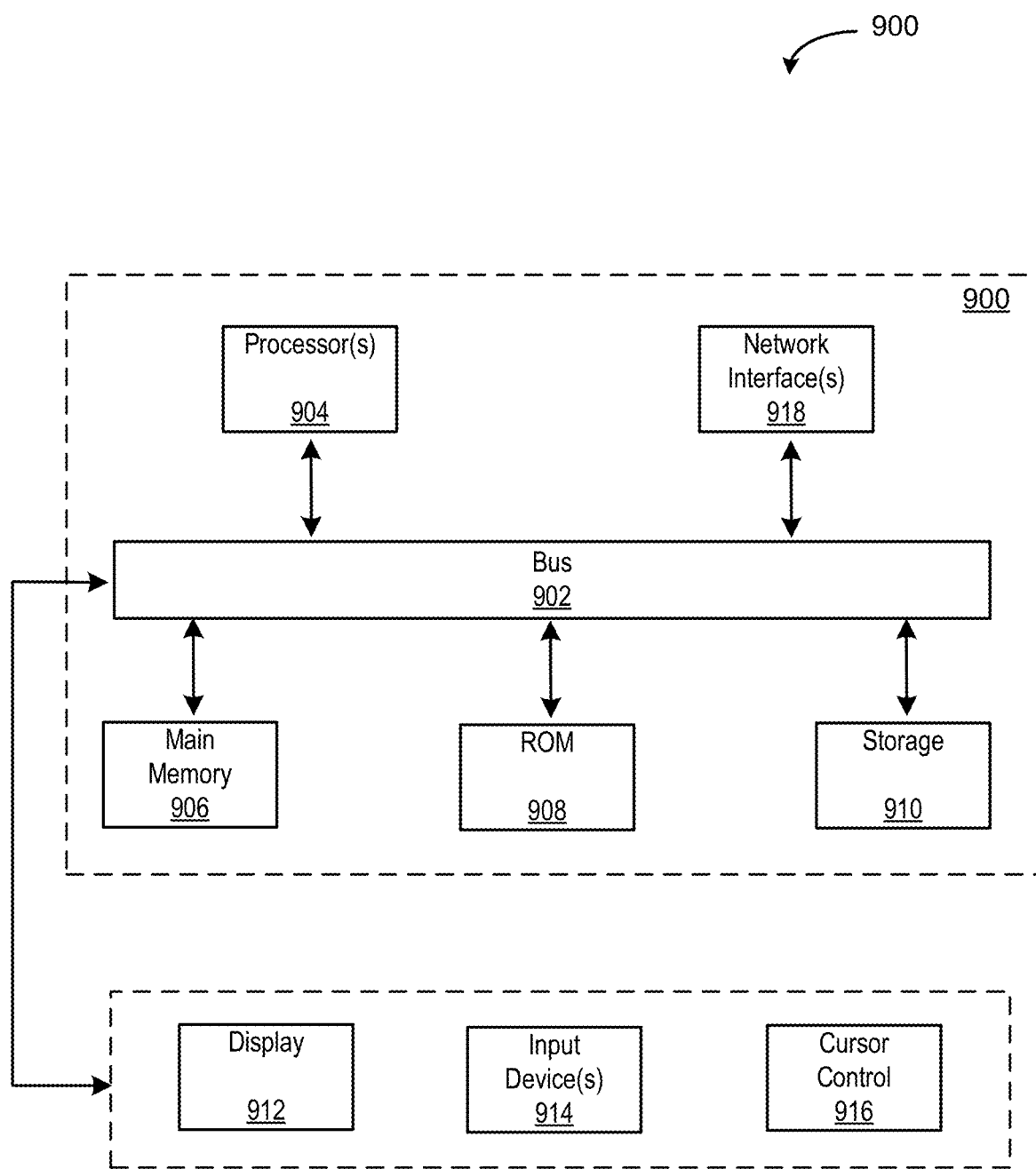
FIG. 9 depicts a block diagram of an example computer system in which various of the embodiments described herein may be implemented.

FIG. 9 depicts a block diagram of an example computer system 900 in which embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Network interface 918 provides a two-way data communication coupling to one or more network links that are connected to one or more local networks. For example, network interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 918, which carry the digital data to and from computer system 900, are example forms of transmission media.

The computer system 900 can send messages and receive data, including program code, through the network(s), network link and network interface 918. In the Internet example, a server might transmit a requested code for an application program through the Internet, the ISP, the local network and the network interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
a hardware processor; and
a non-transitory machine-readable storage medium encoded with instructions that, when executed by the hardware processor cause the hardware processor to:
provide, in a customer domain, an environment operations layer, the environment operations layer controlling a plurality of sensors and actuators within a cloud environment, and the environment operations layer being specific to an implementation of the cloud environment;
provide a controls layer, the controls layer comprising a plurality of controls to control the sensors and actuators in accordance with one or more compliance rules, the plurality of controls layer being independent of the implementation of the cloud environment; and provide a user interface, the user interface comprising a plurality of management tools to manage the plurality of controls.

2. The system of claim 1, the medium further encoded with instructions that, when executed, cause the hardware processor to provide the controls layer in an external domain outside the customer domain.

3. The system of claim 2,
the medium further encoded with instructions that, when executed, cause the hardware processor to provide, in the customer domain, a further environment operations layer, the further environment operations layer controlling a plurality of further sensors and further actuators within a further cloud environment;
wherein the controls layer is a unified controls layer and further comprises, in addition to the plurality of controls to control the sensors and actuators of the cloud environment, a plurality of further controls to control the further sensors and the further actuators in accordance with one or more further compliance rules; and
wherein the user interface is a unified user interface and further comprises, in addition to the plurality of management tools to manage the plurality of controls, a plurality of further management tools to manage the plurality of further controls.

4. The system of claim 1, the medium further encoded with instructions that, when executed, cause the hardware processor to provide the user interface and the controls layer in the customer domain.

5. The system of claim 4, the medium further encoded with instructions that, when executed, cause the hardware processor to:
provide, in the customer domain, a further environment operations layer, the further environment operations layer controlling a plurality of further sensors and further actuators within a further cloud environment;
provide, in the customer domain, a further controls layer, the further controls layer comprising a plurality of further controls to control the further sensors and the further actuators in accordance with one or more further compliance rules; and
provide a further user interface in an external domain outside the customer domain, the further user interface comprising a plurality of further management tools to manage the further controls.

6. The system of claim 1, the medium further encoded with instructions that, when executed, cause the hardware processor to provide the user interface in an external domain outside the customer domain.

7. A non-transitory machine-readable storage medium encoded with instructions executable by a hardware processor of a computing component, the machine-readable storage medium comprising instructions that, when executed, cause the hardware processor to:
provide, in a customer domain, an environment operations layer, the environment operations layer controlling a plurality of sensors and actuators within a cloud environment, and the environment operations layer being specific to an implementation of the cloud environment;
provide a controls layer, the controls layer comprising a plurality of controls to control the sensors and actuators in accordance with one or more compliance rules, the controls layer being independent of the implementation of the cloud environment; and
provide a user interface, the user interface comprising a plurality of management tools to manage the plurality of controls.

8. The medium of claim 7, further encoded with instructions that, when executed, cause the hardware processor to the controls layer in an external domain outside the customer domain.

9. The medium of claim 8
further encoded with instructions that, when executed, cause the hardware processor to provide, in the customer domain, a further environment operations layer, the further environment operations layer controlling a plurality of further sensors and further actuators within a further cloud environment;
wherein the controls layer is a unified controls layer and further comprises, in addition to the plurality of controls to control the sensors and actuators of the cloud environment, a plurality of further controls to control the further sensors and the further actuators in accordance with one or more further compliance rules; and
wherein the user interface is a unified user interface and further comprises, in addition to the plurality of management tools to manage the plurality of controls, a plurality of further management tools to manage the plurality of further controls.

10. The medium of claim 7 further encoded with instructions that, when executed, cause the hardware processor to provide the user interface in the customer domain.

11. The medium of claim 7 further encoded with instructions that, when executed, cause the hardware processor to provide the controls layer in the customer domain.

12. The medium of claim 11 further encoded with instructions that, when executed, cause the hardware processor to:
provide, in the customer domain, a further environment operations layer, the further environment operations layer controlling a plurality of further sensors and further actuators within a further cloud environment;
provide, in the customer domain, a further controls layer, the further controls layer comprising a plurality of further controls to control the further sensors and the further actuators in accordance with one or more further compliance rules; and
provide a further user interface in an external domain outside the customer domain, the further user interface comprising a plurality of further management tools to manage the further controls.

13. The medium of claim 7 further encoded with instructions that, when executed, cause the hardware processor to provide the user interface in an external domain outside the customer domain.

14. A method comprising:
providing, in a customer domain, an environment operations layer, the environment operations layer controlling a plurality of sensors and actuators within a cloud environment, and the environment operations layer being specific to an implementation of the cloud environment;
providing a controls layer, the controls layer comprising a plurality of controls to control the sensors and actuators in accordance with one or more compliance rules, the plurality of controls layer being independent of the implementation of the cloud environment; and
providing a user interface, the user interface comprising a plurality of management tools to manage the plurality of controls.

15. The method of claim 14, further comprising providing the controls layer in an external domain outside the customer domain.

16. The method of claim 15, further comprising:
providing, in the customer domain, a further environment operations layer, the further environment operations layer controlling a plurality of further sensors and further actuators within a further cloud environment;
wherein the controls layer is a unified controls layer and further comprises, in addition to the plurality of controls to control the sensors and actuators of the cloud environment, a plurality of further controls to control the further sensors and the further actuators in accordance with one or more further compliance rules; and
wherein the user interface is a unified user interface and further comprises, in addition to the plurality of management tools to manage the plurality of controls, a plurality of further management tools to manage the plurality of further controls.

17. The method of claim 14, further comprising providing the user interface in the customer domain.

18. The method of claim 14, further comprising providing the controls layer in the customer domain.

19. The method of claim 18, further comprising:
providing, in the customer domain, a further environment operations layer, the further environment operations layer controlling a plurality of further sensors and further actuators within a further cloud environment;
providing, in the customer domain, a further controls layer, the further controls layer comprising a plurality of further controls to control the further sensors and the further actuators in accordance with one or more further compliance rules; and
providing a further user interface in an external domain outside the customer domain, the further user interface comprising a plurality of further management tools to manage the further controls.

20. The method of claim 19, wherein the cloud environment and the further cloud environment are associated with different customers.

* * * * *